US010045269B2

(12) United States Patent
Zhu et al.

(10) Patent No.: US 10,045,269 B2
(45) Date of Patent: Aug. 7, 2018

(54) NETWORK ACCESS PROCESSING METHOD AND APPARATUS

(71) Applicant: Huawei Technologies Co., Ltd., Shenzhen (CN)

(72) Inventors: Chunsheng Zhu, Beijing (CN); Tao Kong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 141 days.

(21) Appl. No.: 15/135,261

(22) Filed: Apr. 21, 2016

(65) Prior Publication Data
US 2016/0242089 A1 Aug. 18, 2016

Related U.S. Application Data
(63) Continuation of application No. PCT/CN2014/085020, filed on Aug. 22, 2014.

(30) Foreign Application Priority Data
Oct. 22, 2013 (CN) .......................... 2013 1 0502955

(51) Int. Cl.
H04L 1/00 (2006.01)
H04W 36/22 (2009.01)
(Continued)

(52) U.S. Cl.
CPC ........... H04W 36/22 (2013.01); H04W 24/02 (2013.01); H04W 48/18 (2013.01)

(58) Field of Classification Search
CPC ...... H04W 36/22; H04W 48/18; H04W 24/02
(Continued)

(56) References Cited

U.S. PATENT DOCUMENTS

2012/0324100 A1* 12/2012 Tomici ................. H04L 45/123
709/224
2013/0121282 A1 5/2013 Liu
2013/0265985 A1 10/2013 Salkintzis

FOREIGN PATENT DOCUMENTS

CN 101471759 A 7/2009
CN 102740361 A 10/2012
(Continued)

Primary Examiner — Chi H Pham
Assistant Examiner — Alexander O Boakye
(74) Attorney, Agent, or Firm — Leydig, Voit & Mayer, Ltd.

(57) ABSTRACT

Embodiments of the present disclosure provide a network access processing method and apparatus. The method includes: receiving traffic information and network load information that are reported by multiple access networks; determining a target access network in the multiple access networks according to the traffic information and the network load information; and when a current access network of a user terminal is different from the target access network: if the user terminal supports an inter-system mobility policy (ISMP), handing over the user terminal to the target access network; or if the user terminal supports an inter-system routing policy (ISRP) and it is determined that at least one application on the user terminal can be handed over to the target access network, handing over the at least one application to the target access network. In this way, properness of selecting an access network for a terminal or a terminal application can be improved.

12 Claims, 3 Drawing Sheets

(51) Int. Cl.
*H04W 48/18* (2009.01)
*H04W 24/02* (2009.01)

(58) Field of Classification Search
USPC .......................................................... 370/252
See application file for complete search history.

(56) References Cited

FOREIGN PATENT DOCUMENTS

| | | |
|---|---|---|
| CN | 102802239 A | 11/2012 |
| CN | 103037469 A | 4/2013 |
| CN | 103200696 A | 7/2013 |
| CN | 103561454 A | 2/2014 |
| EP | 2544487 A1 | 1/2013 |

* cited by examiner

NETWORK ACCESS PROCESSING METHOD AND APPARATUS

CROSS-REFERENCE TO RELATED APPLICATIONS

This application is a continuation of International Patent Application No. PCT/CN2014/085020, filed on Aug. 22, 2014, which claims priority to Chinese Patent Application No. 201310502955.2, filed on Oct. 22, 2013, both of which are incorporated herein by reference in their entireties.

TECHNICAL FIELD

The present disclosure relates to the field of communications technologies, and in particular, to a network access processing method and apparatus.

BACKGROUND

To meet a requirement imposed by a user on a data service, an operator not only upgrades a cellular network, but also introduces a WLAN (wireless local area network) and the like, to relieve data traffic pressure, so that a wireless access network gradually becomes heterogeneous. In a heterogeneous network, how to enable a user to use a most proper access network at a proper time in a proper place to obtain optimal network application experience is most concerned by people.

Currently, in the conventional art, an access network is selected for a user mostly based on only a current network load status of an area in which the user is located, and an implementation process may be briefly described as follows: First, a WLAN and a cellular network reports their respective network load statuses to an ANDSF (Access Network Discovery and Selection Function) server; then, the ANDSF server configures, with reference to a load status of each network, a policy for connecting a user terminal to a network, that is, an ISMP (Inter-system Mobility Policy) or an ISRP (Inter-system Routing Policy). However, this process may cause the following problems: for example, when load of the cellular network is relatively low, the terminal is controlled to access the cellular network, and if there is still traffic remaining in a traffic package subscribed to by the user, no extra fee is incurred when the terminal access the cellular network; and if the traffic package subscribed to by the user is used up, and the network load status does not change, when the terminal assesses the cellular network, extra expenses are brought to the user.

It can be learned that, in the conventional art, an access network is determined according to a single basis, and a processing process is simple, which cannot ensure properness of selecting an access network for a terminal.

SUMMARY

Embodiments of the present disclosure provide a network access processing method and apparatus, which are used to improve properness of selecting an access network for a terminal.

In view of this, the embodiments of the present disclosure provide the following technical solutions:

According to a first aspect, an embodiment of the present disclosure provides a network access processing method, where the method includes:

receiving traffic information and network load information that are reported by multiple access networks;

determining a target access network in the multiple access networks according to the traffic information and the network load information; and when a current access network of a user terminal is different from the target access network:

if the user terminal supports an ISMP, handing over the user terminal to the target access network; or if the user terminal supports an inter-system routing policy ISRP and it is determined that at least one application on the user terminal can be handed over to the target access network, handing over the at least one application to the target access network.

In a first possible implementation manner of the first aspect, the method further includes:

when the current access network of the user terminal is the same as the target access network, maintaining a connection of the user terminal to the current access network.

With reference to the first aspect or the first possible implementation manner of the first aspect, in a second possible implementation manner, the receiving traffic information reported by multiple access networks includes:

receiving the traffic information that is reported by the multiple access networks according to a preset period; or receiving the traffic information that is reported, as triggered by a preset event, by the multiple access networks.

With reference to the second possible implementation manner of the first aspect, in a third possible implementation manner, the preset event includes: remaining user traffic is not greater than a preset value, or a level of remaining user traffic changes, or used traffic is greater than a threshold, or a level of used traffic changes, or the user terminal enables a preset service type.

With reference to the first aspect or the first possible implementation manner of the first aspect, in a fourth possible implementation manner, the receiving network load information reported by multiple access networks includes:

receiving the network load information that is reported by the multiple access networks according to a preset period; or receiving the network load information that is reported, as triggered by a preset event, by the multiple access networks; or receiving the network load information that is reported by the multiple access networks when the multiple access networks report, as triggered by a preset event, the traffic information.

With reference to the fourth possible implementation manner of the first aspect, in a fifth possible implementation manner, the preset event includes: remaining user traffic is not greater than a preset value, or a level of remaining user traffic changes, or used traffic is greater than a threshold, or a level of used traffic changes, or the user terminal enables a preset service type.

With reference to the first aspect or the first possible implementation manner of the first aspect, in a sixth possible implementation manner, the determining a target access network in the multiple access networks according to the traffic information and the network load information includes:

if it is determined, according to the traffic information and the network load information, that one first access network exists in the multiple access networks, determining the first access network as the target access network, where the first access networks are access networks with most remaining traffic and least access load; or if it is determined, according to the traffic information and the network load information, that at least two first access networks exist in the multiple access networks, determining one of the first access networks as the target access network according to a preset policy, where the first access networks are access networks with most remaining traffic and least access load; or if it is determined, according to the traffic information and the network load information, that at least two second access networks exist in the multiple access networks, determining a second access network with most remaining traffic as the target access network, where the second access networks are access networks with remaining traffic not less than a predetermined value and access load exceeding a preset value; or if it is determined, according to the traffic information and the network load information, that at least two third access networks exist in the multiple access networks, determining one of the third access networks as the target access network according to a preset policy, where the third access networks are access networks with remaining traffic less than a predetermined value and access load exceeding a preset value; or if it is determined, according to the traffic information and the network load information, that at least two third access networks exist in the multiple access networks, determining a third access network with a lowest tariff as the target access network, where the third access networks are access networks with remaining traffic less than a predetermined value and access load exceeding a preset value.

With reference to the first aspect or any one of the first to the sixth possible implementation manners of the first aspect, in a seventh possible implementation manner, the method further includes:

when an access network to which the user terminal is connected changes, sending, to the user terminal, a message that comprises traffic information and/or network load information.

According to a second aspect, an embodiment of the present disclosure provides a network access processing apparatus, where the apparatus includes:

a receiving unit, configured to receive traffic information and network load information that are reported by multiple access networks; and a determining unit, configured to determine a target access network in the multiple access networks according to the traffic information and the network load information; and when a current access network of a user terminal is different from the target access network:

if the user terminal supports an ISMP, hand over the user terminal to the target access network; or if the user terminal supports an inter-system routing policy ISRP and it is determined that at least one application on the user terminal can be handed over to the target access network, hand over the at least one application to the target access network.

In a first possible implementation manner of the second aspect, the determining unit is further configured to: when the current access network of the user terminal is the same as the target access network, maintain a connection of the user terminal to the current access network.

With reference to the second aspect or the first possible implementation manner of the second aspect, in a second possible implementation manner, the receiving unit is configured to receive the traffic information that is reported by the multiple access networks according to a preset period; or the receiving unit is configured to receive the traffic information that is reported, as triggered by a preset event, by the multiple access networks.

With reference to the second aspect or the first possible implementation manner of the second aspect, in a third possible implementation manner, the receiving unit is configured to receive the network load information that is reported by the multiple access networks according to a preset period; or the receiving unit is configured to receive the network load information that is reported, as triggered by a preset event, by the multiple access networks; or the receiving unit is configured to receive the network load information that is reported by the multiple access networks when the multiple access networks report, as triggered by a preset event, the traffic information.

With reference to the second aspect or the first possible implementation manner of the second aspect, in a fourth possible implementation manner, the determining unit is configured to:

if it is determined, according to the traffic information and the network load information, that one first access network exists in the multiple access networks, determine the first access network as the target access network, where the first access networks are access networks with most remaining traffic and least access load; or if it is determined, according to the traffic information and the network load information, that at least two first access networks exist in the multiple access networks, determine one of the first access networks as the target access network according to a preset policy, where the first access networks are access networks with most remaining traffic and least access load; or if it is determined, according to the traffic information and the network load information, that at least two second access networks exist in the multiple access networks, determine a second access network with most remaining traffic as the target access network, where the second access networks are access networks with remaining traffic not less than a predetermined value and access load exceeding a preset value; or if it is determined, according to the traffic information and the network load information, that at least two third access networks exist in the multiple access networks, determine one of the third access networks as the target access network according to a preset policy, where the third access networks are access networks with remaining traffic less than a predetermined value and access load exceeding a preset value; or if it is determined, according to the traffic information and the network load information, that at least two third access networks exist in the multiple access networks, determine a third access network with a lowest tariff as the target access network, where the third access networks are access networks with remaining traffic less than a predetermined value and access load exceeding a preset value.

With reference to the second aspect or any one of the first to the fourth possible implementation manners of the second aspect, in a fifth possible implementation manner, the apparatus further includes:

a sending unit, configured to: when an access network to which the user terminal is connected changes, send, to the user terminal, a message that includes traffic information and/or network load information.

According to a third aspect, an embodiment of the present disclosure provides a network access processing apparatus, where the apparatus includes: at least one processor, a memory, and at least one communications bus, where the communications bus is configured to implement communication connection between the at least one processor and the memory; and the memory is configured to store a program instruction, and the processor is configured to perform the following steps according to the program instruction:

receiving traffic information and network load information that are reported by multiple access networks;

determining a target access network in the multiple access networks according to the traffic information and the network load information; and when a current access network of a user terminal is different from the target access network:

if the user terminal supports an ISMP, handing over the user terminal to the target access network; or if the user terminal supports an inter-system routing policy ISRP and it is determined that at least one application on the user terminal can be handed over to the target access network, handing over the at least one application to the target access network.

In a first possible implementation manner of the third aspect, the processor is further configured to perform the following step:

when the current access network of the user terminal is the same as the target access network, maintaining a connection of the user terminal to the current access network.

With reference to the third aspect or the first possible implementation manner of the third aspect, in a second possible implementation manner, the processor receives the traffic information in the following manner:

receiving the traffic information that is reported by the multiple access networks according to a preset period; or receiving the traffic information that is reported, as triggered by a preset event, by the multiple access networks.

With reference to the third aspect or the first possible implementation manner of the third aspect, in a third possible implementation manner, the processor receives the network load information in the following manner:

receiving the network load information that is reported by the multiple access networks according to a preset period; or receiving the network load information that is reported, as triggered by a preset event, by the multiple access networks; or receiving the network load information that is reported by the multiple access networks when the multiple access networks report, as triggered by a preset event, the traffic information.

With reference to the third aspect or the first possible implementation manner of the third aspect, in a fourth possible implementation manner, the processor determines the target access network in the following manner:

if it is determined, according to the traffic information and the network load information, that one first access network exists in the multiple access networks, determining the first access network as the target access network, where the first access networks are access networks with most remaining traffic and least access load; or if it is determined, according to the traffic information and the network load information, that at least two first access networks exist in the multiple access networks, determining one of the first access networks as the target access network according to a preset policy, where the first access networks are access networks with most remaining traffic and least access load; or if it is determined, according to the traffic information and the network load information, that at least two second access networks exist in the multiple access networks, determining a second access network with most remaining traffic as the target access network, where the second access networks are access networks with remaining traffic not less than a predetermined value and access load exceeding a preset value; or if it is determined, according to the traffic information and the network load information, that at least two third access networks exist in the multiple access networks, determining one of the third access networks as the target access network according to a preset policy, where the third access networks are access networks with remaining traffic less than a predetermined value and access load exceeding a preset value; or if it is determined, according to the traffic information and the network load information, that at least two third access networks exist in the multiple access networks, determining a third access network with a lowest tariff as the target access network, where the third access networks are access networks with remaining traffic less than a predetermined value and access load exceeding a preset value.

With reference to the third aspect or any one of the first to the fourth possible implementation manners of the third aspect, in a fifth possible implementation manner, the processor is further configured to perform the following step:

when an access network to which the user terminal is connected changes, sending, to the user terminal, a message that includes traffic information and/or network load information.

According to the network access processing method and apparatus in the embodiments of the present disclosure, traffic information and network load information of an access network are acquired, a current congestion status of each access network is reflected by using network load information, a tariff that may be incurred by a data service is reflected by using traffic information, and a target access network is selected for a user terminal or a terminal application with reference to these two aspects of information, so as to improve properness of selecting an access network for a terminal or an terminal application. In this way, it can be ensured that a user experiences a high-speed data service with high quality, and an extra tariff can be reduced or even no extra tariff is incurred, thereby improving user experience and increasing user stickiness.

BRIEF DESCRIPTION OF DRAWINGS

To describe the technical solutions in the embodiments of the present disclosure more clearly, the following briefly introduces the accompanying drawings required for describing the embodiments or the conventional art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To enable a person skilled in the art to better understand the solutions in the embodiments of the present disclosure, the following describes the embodiments of the present disclosure in further detail with reference to the accompanying drawings and implementation manners.

The solutions in the present disclosure mainly resolves a problem of how to select, in a heterogeneous network, a proper access network for a user terminal, to ensure that a user experiences a high-speed service with high quality and a tariff is reduced to a greatest extent.

A heterogeneous network that includes a cellular network and a WLAN is used as an example in the following, to describe a network access processing process in the embodiments of the present disclosure.

Figure 1:
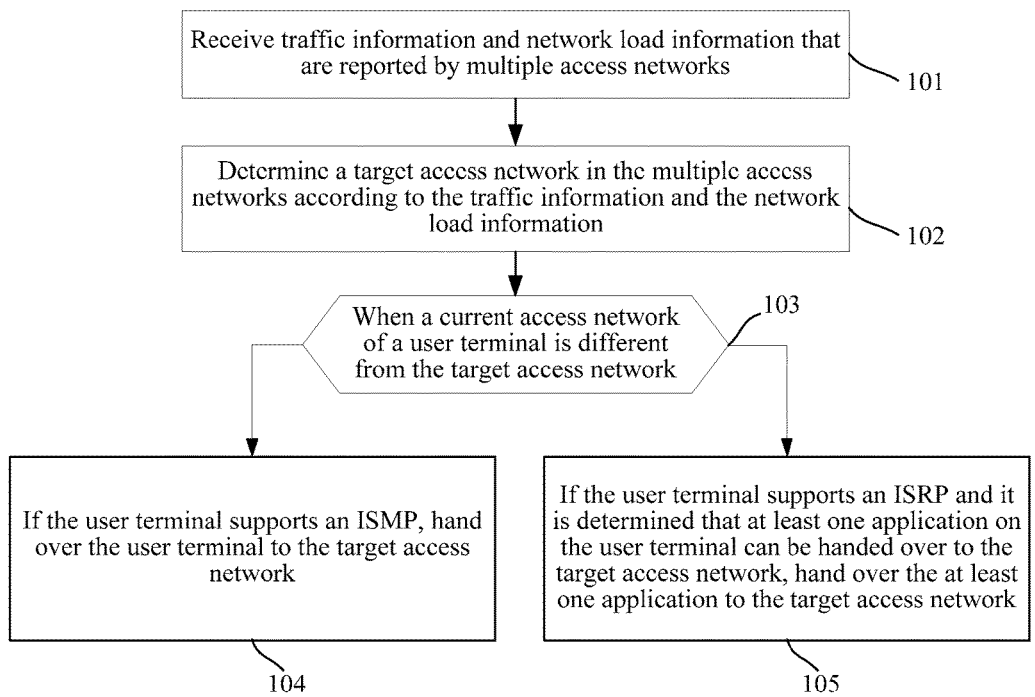
FIG. 1 is a flowchart of Embodiment 1 of a network access processing method according to the present disclosure.

Referring to FIG. 1, FIG. 1 is a flowchart of Embodiment 1 of a network access processing method according to the present disclosure, and the network access processing method may include:

Step 101: Receive traffic information and network load information that are reported by multiple access networks.

To implement interworking and convergence of a 3GPP (3rd Generation Partnership Project) access network and a WLAN access network, an access network discovery and selection function ANDSF (Access Network Discovery and Selection Function) network element is defined in a 3GPP standard, and the network element determines a proper access network for a user terminal.

In this step, each access network first monitors and acquires traffic information of the user terminal in each access network and current network load information of each access network, and reports the traffic information and the current network load information to the ANDSF network element. The network load information may reflect a current congestion status of an access network, and is used to ensure quality of a user data service; and the traffic information may reflect usage of a traffic package of a user terminal, and is used to reduce a tariff.

Processes of acquiring the two pieces of information are described in the following.

1. Traffic Information (1) For a 3GPP Access Network:

First, traffic that has already been used by a user can be obtained in real time from a gateway (referred to as a GGSN, a Gateway GPRS Support Node; or referred to as a P-GW, a PDN Gateway) by using a policy and charging rules function PCRF (Policy and Charging Rules Function) or an online charging system OCS (Online Charging System), and with reference to a traffic package subscribed to by the user, traffic remaining in the package of the user may further be determined.

Next, the PCRF or the OCS reports the traffic information to the ANDSF network element. For this, the following two aspects need to be described:

a. Reporting manner

If a convergence capability enabler Enabler exists in the network, the PCRF or the OCS reports the traffic information to the ANDSF by using the Enabler.

If no Enabler exists in the network, the PCRF or the OCS may directly report the traffic information to the ANDSF.

b. Reporting occasion

The PCRF or the OCS may report the traffic information to the ANDSF according to a preset period. Specifically, the preset period may be a fixed period; or may be a variable period, for example, when there is sufficient traffic remaining in the package (or traffic in the package is not used much), a long period is set, and before the remaining traffic is close to a preset value indicating insufficient remaining traffic, a short period is set, to frequently monitor a traffic change in the package of the user.

Alternatively, the PCRF or the OCS may report the traffic information to the ANDSF as triggered by a preset event. Specifically, the preset event may be manifested as follows: Remaining user traffic is not greater than a preset value, or a level of remaining user traffic changes, or used traffic is greater than a threshold, or a level of used traffic changes, or the user terminal enables a preset service type, or the like. Descriptions are made separately in the following.

(I). If a triggering event is that remaining user traffic is not greater than a preset value, when the PCRF/OCS determines that the remaining traffic is not greater than the preset value, it indicates that the traffic information changes, and current traffic of the package of the user is insufficient; in this case, reference needs to be made to the traffic information and the network load information to determine an access network for the terminal, to ensure that quality of a user service is considered and a fee caused accordingly is reduced, thereby improving a matching degree between the terminal and an access network.

It should be noted that, a case in which a triggering event is that used traffic is greater than a threshold is similar to the processing principle of the foregoing case in which the remaining user traffic is not greater than the preset value, and details are not described herein.

(II). If a triggering event is that a level of remaining user traffic changes, an operator or a user needs to preset thresholds of multiple levels for remaining traffic, so that when the level of the remaining traffic changes, the ANDSF can accordingly perform more refined service distribution to enable different services on the terminal to be connected to different networks for the terminal. It should be noted that, the foregoing case in which the remaining user traffic is not greater than the preset value may also be considered as a case in which the level of the remaining traffic changes, but only two levels are set for the foregoing case correspondingly.

It should be noted that, a case in which a triggering event is that a level of used traffic changes is similar to the processing principle of the foregoing case in which the level of the remaining traffic changes, and details are not described herein either.

(III). If a triggering event is that the user terminal enables a preset service type, an operator or a user needs to preselect some preset service types; in this case, when the user enables a preset service, a gateway senses a service type of the user, and if the service type is a preset service type, the gateway triggers the PCRF or the OCS to report the traffic information to the ANDSF, so that the ANDSF determines, according to the traffic information and the network load information, a network to which the terminal is currently connected or a network to which the preset application is currently attached.

(2) For a WLAN Access Network

An AAA (Authentication Authorization Account) stores traffic package information of a user, and a broadband remote access server BRAS (broadband remote access server) can report user traffic to the AAA in real time; in this way, the AAA can report the traffic information to the ANDSF directly or by using an Enabler.

In addition, as a protocol evolves subsequently, if the WLAN and the 3GPP have a uniform gateway, a charging function may be integrated into the OCS, and in this case, the OCS can both report traffic information of a 3GPP network and report traffic information of a WLAN.

It should be noted that, the traffic information in this embodiment of the present disclosure may be manifested as traffic remaining in a package of a user. For example, if a package subscribed to by the user is 300 M, and traffic currently consumed is 270 M, the traffic information may be manifested as remaining 30 M or remaining 10% of traffic in the package. Alternatively, the traffic information may be manifested as a package subscribed to by the user and used traffic. In addition, the traffic information may be manifested as traffic change information. For example, if 10% is preset as a preset value for determining whether the traffic is insufficient, in the foregoing example, once the consumed traffic exceeds 270 M, it is considered that the traffic information changes, and correspondingly, the traffic information may be manifested as a change result indicating insufficient traffic; or multiple traffic levels may be set, and once a traffic level changes, it may also be considered that the traffic information changes, and correspondingly, the traffic information may be manifested as a change result indicating the traffic is downgraded (upgraded) from which level to which level. Certainly, the traffic information may be manifested, according to an actual requirement, as both the remaining traffic (or used traffic and package information) and the traffic change information, which may not be limited in the present disclosure.

In addition, it should be further noted that, as an implementation solution of this step, traffic information of the user in only one access network (for example, a 3GPP access network with a relatively high tariff, which may be defined by the operator or the user according to an actual situation, and may not be limited in the present disclosure) may be acquired, and an access policy is determined for the user terminal with reference to the information and network load information of the 3GPP and the WLAN. Certainly, as an optimal solution of this step, traffic information of the user in different access networks should be acquired, so that the ANDSF can determine a most proper access policy for the user terminal with reference to all these pieces of information.

2. Network Load Information (1) For a 3GPP Access Network

After a base station or a controller obtains network load information, a gateway (GGSN/P-GW) reports the network load information to an Enabler, and then the Enabler reports the network load information to an ANDSF network element; or when no Enabler exists in the network, a gateway directly reports the network load information to an ANDSF; or a base station or a controller may report an obtained the network load information to an ANDSF directly or by using an Enabler, which may not be limited in the present disclosure.

(2) For a WLAN Access Network

An access point AP (Access Point) of an area in which the user is located obtains network load information, reports the network load information to an access controller AC (Access Controller), the AC reports the network load information to an Enabler, and then the Enabler reports the network load information to an ANDSF network element; or when no Enabler exists in the network, an AC directly reports the network load information to an AND SF.

Occasions on which the 3GPP access network and the WLAN access network report the network load information to the ANDSF may be manifested as follows:

a. Report the network load information to the ANDSF according to a preset period, the preset period may be the same as a period for reporting traffic information by an access network, or a different period may be used, which may not be limited in the present disclosure.

b. Report, as triggered by a preset event, the network load information to the ANDSF, which may be as follows: presetting one load threshold, and if network load is greater than the preset value, reporting, as triggered, the network load information to the ANDSF; or setting multiple load thresholds, that is, setting multiple load levels, and if a level of network load changes, similarly, reporting, as triggered, the network load information to the AND SF.

c. If an Enabler exists in the network, after receiving traffic information that is reported as triggered by a preset event, the Enabler may report both the traffic information and current network load information to the ANDSF, and in this way, the ANDSF can accurately determine, according to a latest congestion status of the network and latest traffic usage, a policy for connecting the terminal to the network.

Step 102: Determine a target access network in the multiple access networks according to the traffic information and the network load information.

With reference to the traffic information and the network load information that are fed back by the access networks, this embodiment of the present disclosure provides the following manners for determining a target access network, which are described in the following one by one.

Case 1: At least one first access network exists in the multiple access networks. The first access network may be construed as an access network with most remaining traffic and least access load. Corresponding to this case, a manner for determining a target access network provided in this embodiment of the present disclosure is as follows:

(1). if only one first access network exists, determining the first access network as the target access network; or (2). if at least two first access networks exist, selecting one first access network, according to a preset policy of an operator or a user, from the at least two first access networks as the target access network.

Case 2: At least two second access networks exist in the multiple access networks. The second access networks may be construed as access networks with remaining traffic not less than a predetermined value (that is, traffic is sufficient) and access load exceeding a preset value (that is, load is heavy). Corresponding to this case, a manner for determining a target access network provided in this embodiment of the present disclosure is as follows:

determining a second access network with most remaining traffic in the at least two second access networks as the target access network.

Case 3: At least two third access networks exist in the multiple access networks. The third access networks may be construed as access networks with remaining traffic less than a predetermined value (that is, traffic is insufficient) and access load exceeding a preset value (that is, load is heavy). Corresponding to this case, a manner for determining a target access network provided in this embodiment of the present disclosure is as follows:

(1). determining one third access network of the at least two third access networks as the target access network according to a preset policy of an operator or a user; or (2). determining a third access network with a lowest tariff in the at least two third access networks as the target access network.

Step 103: When a current access network of a user terminal is different from the target access network, perform step 104 or step 105 to perform an access network handover.

Step 104: If the user terminal supports an ISMP, hand over the user terminal to the target access network.

Step 105: If the user terminal supports an inter-system routing policy ISRP and it is determined that at least one application on the user terminal can be handed over to the target access network, hand over the at least one application to the target access network.

When network access processing is performed, two specific application scenarios exist in the solution of the present disclosure:

A first scenario is that: a user terminal can access only one network at a same moment, that is, network access in an ISMP (Inter-system Mobility Policy) scenario.

A second scenario is that: a user terminal can access at least two networks at a same moment, that is, network access in an ISRP (inter-system routing policy) scenario.

1. In the first application scenario, the terminal can only access a 3GPP network or a WLAN at a same moment, and in this case, the ANDSF can select a target access network for the terminal in real time according to traffic information and network load information. In other words, once the traffic information changes (for example, changes from sufficient to insufficient, or changes from insufficient to sufficient), and/or the load information changes (for example, changes from idle to congested, or changes from congested to idle), the ANDSF can hand over the terminal to an access network accordingly.

With reference to the manner for determining a target access network described above, a network access process in the ISMP scenario is described in the following.

(1). Preferably, the terminal (that is, all applications of the terminal) is connected to an access network (that is, the foregoing first access network) with sufficient remaining traffic (or less used traffic) and light network load, and in this way, it can be ensured that a user experiences a high-speed data service with high quality and does not need to pay an extra fee incurred accordingly, thereby ensuring properness of selecting an access network for the terminal.

(2). When a case of congestion occurs in two access networks (it may be considered that a case of congestion occurs when load of an access network is relatively heavy), the ANDSF may determine, according to traffic information of the two access networks, a network to which the terminal is connected. Preferably, the terminal is connected to an access network (that is, the foregoing second access network) with sufficient remaining traffic; and if a case in which remaining traffic is insufficient in the two access networks occurs, a network (that is, the foregoing third access network) to which the terminal is connected may be determined according to a preset policy of an operator or a user, or the terminal may be connected, according to tariffs of access networks, to a network (that is, the foregoing third access network) with a relatively low tariff, to reduce fees for the user as much as possible.

(3). When remaining traffic of two access networks is sufficient, a network to which the terminal is connected may be determined according to a preset policy of an operator or a user.

2. In the second application scenario, that the terminal can assess two networks at a same moment as an example, where the terminal can access both the 3GPP network and the WLAN at a same moment. In this case, the ANDSF can select, in real time, an access network for different applications of the terminal according to the traffic information and the network load information, which may also be construed as that the ANDSF performs service distribution for the terminal according to the traffic information and the network load information. In other words, once the traffic information changes, and/or the load information changes, the ANDSF can accordingly hand over at least one application that can be handed over on the terminal to a selected target access network.

With reference to the manner for determining a target access network described above, a network access process in the ISRP scenario is described in the following.

First, it should be noted that, in the ISRP scenario, there may be two types of terminal applications: one type of terminal application needs to be attached to the 3GPP access network; and the other type of terminal application does not have a requirement on an attached access network, that is, such application can be attached to any access network. As an example, the terminal applications may be classified according to service quality requirements of the applications. For example, an application that needs to run with high quality is classified as a first-type application, and the other applications are classified as second-type applications; or an application of a specified type is classified as a first-type application, and the other types of applications are classified as second-type applications; or an unimportant application or an application selected in advance by the user may be classified as a second-type application, which may not be limited in this embodiment of the present disclosure. In this way, after the target access network is determined with reference to a change in the traffic information and/or the load information, the second-type application can be handed over to the target access network.

If the determined target access network is a 3GPP access network, all applications (the first-type and second-type applications) of the terminal are attached to the 3GPP access network; if the determined target access network is another network, for example, a WLAN access network, the second-type application is handed over to the WLAN access network, and the first-type application is still attached to the 3GPP access network. In this way, a second-type application that can be handed over can be handed over, according to an actual change in traffic and load, to the determined target access network, thereby ensuring properness of selecting an access network for the terminal.

Figure 2:
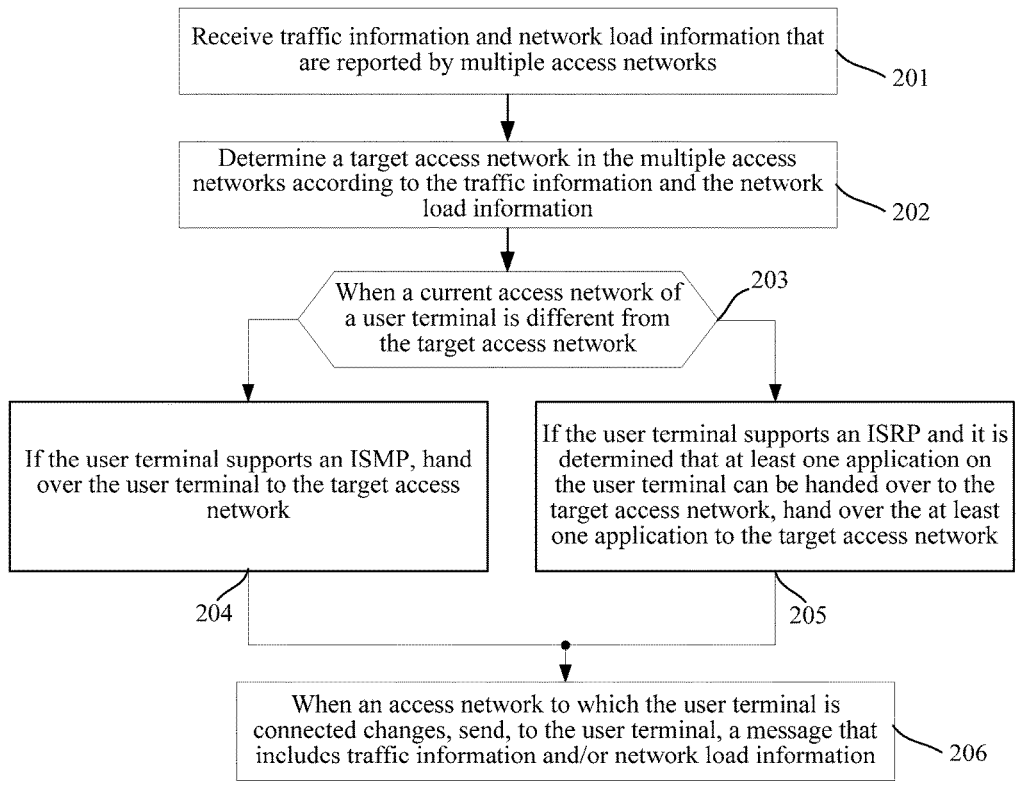
FIG. 2 is a flowchart of Embodiment 2 of a network access processing method according to the present disclosure.

Referring to FIG. 2, FIG. 2 is a flowchart of Embodiment 2 of a network access processing method according to the present disclosure, and the network access processing method may include:

Step 201: Receive traffic information and network load information that are reported by multiple access networks.

Step 202: Determine a target access network in the multiple access networks according to the traffic information and the network load information.

Step 203: When a current access network of a user terminal is different from the target access network, perform step 204 or step 205 to perform an access network handover.

Step 204: If the user terminal supports an ISMP, hand over the user terminal to the target access network.

Step 205: If the user terminal supports an inter-system routing policy ISRP and it is determined that at least one application on the user terminal can be handed over to the target access network, hand over the at least one application to the target access network.

Step 201 to step 205 are the same as step 101 to step 105, and details are not described herein.

Steps 206: When an access network to which the user terminal is connected changes, send, to the user terminal, a message that includes traffic information and/or network load information.

If in the ISMP policy, an ANDSF hands over, according to the traffic information and the network load information, a network to which the terminal is connected, or in the ISRP policy, an ANDSF hands over, according to the traffic information and the network load information, a network to which a second-type application of the terminal is attached, the ANDSF in this embodiment of the present disclosure sends, to the terminal, a reason for a change, to provide reference for a user.

It should be noted that, the traffic information and/or the network load information may be carried in an ISMP/ISRP policy that changes, and then is sent to the user terminal; or the traffic information and/or the network load information may be included in an independent message, and then is sent to the user terminal, which may not be limited in the present disclosure. Certainly, to consider timeliness of information, the traffic information and/or the network load information is preferably carried when the ISMP/ISRP policy is sent.

This is implemented in a manner of adding, to an S14 interface for communication between the ANDSF and the terminal, a field indicating traffic and/or load information. If the ISMP policy is to hand over the terminal from a 3GPP network to a WLAN due to insufficient remaining traffic, the ANDSF can notify, by using a field that is in a message interface and indicates the traffic information, the user of the terminal that current traffic is insufficient, so that the user knows a reason for handing over an access network; in addition, the user may further be accordingly prompted whether a new traffic package needs to be purchased, and after the user purchases the new traffic package, the ANDSF further hands over the terminal back to the 3GPP network if the network load information does not change. This is mainly because traffic information indicates that traffic changes from insufficient to sufficient after the user purchases the new traffic package. Therefore, the ANDSF re-determines an access network for the terminal according to the two pieces of information: traffic information and load information.

Moreover, it can be learned from the solutions described in Embodiment 1 and Embodiment 2 in the foregoing, after the target access network is determined according to the traffic information and the load information, if the target access network is different from a network to which the application is currently connected, a network handover may be performed according to the ISMP or the ISRP supported by the terminal. Correspondingly, if the target access network is the same as a network to which the application is currently connected, an access network handover may not be performed; instead, a connection of the application of the terminal to the current access network is maintained, if the terminal supports the ISMP, all applications of the terminal continue to be attached to the current access network; if the terminal supports the ISRP, a second-type application of the terminal continues to be attached to the current access network, and certainly, a connection of a first-type application of the terminal to the 3GPP network also maintains unchanged.

Figure 3:
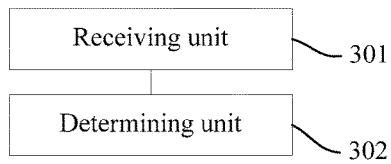
FIG. 3 is a schematic diagram of Embodiment 1 of a network access processing apparatus according to the present disclosure.

Correspondingly, the present disclosure further provides a network access processing apparatus (which may be considered as the foregoing ANDSF). Referring to FIG. 3, FIG. 3 is a schematic diagram of Embodiment 1 of a network access processing apparatus, where the network access processing apparatus may include:

a receiving unit 301, configured to receive traffic information and network load information that are reported by multiple access networks; and a determining unit 302, configured to determine a target access network in the multiple access networks according to the traffic information and the network load information; and when a current access network of a user terminal is different from the target access network:

if the user terminal supports an ISMP, hand over the user terminal to the target access network; or if the user terminal supports an inter-system routing policy ISRP and it is determined that at least one application on the user terminal can be handed over to the target access network, hand over the at least one application to the target access network.

Optionally, the determining unit is further configured to: when the current access network of the user terminal is the same as the target access network, maintain a connection of the user terminal to the current access network.

Optionally, when the network access processing apparatus is configured to receive the traffic information reported by the multiple access networks, the receiving unit is configured to receive the traffic information that is reported by the multiple access networks according to a preset period; or the receiving unit is configured to receive the traffic information that is reported, as triggered by a preset event, by the multiple access networks.

When the network access processing apparatus is configured to receive the network load information reported by the multiple access networks, the receiving unit is configured to receive the network load information that is reported by the multiple access networks according to a preset period; or the receiving unit is configured to receive the network load information that is reported, as triggered by a preset event, by the multiple access networks; or the receiving unit is configured to receive the network load information that is reported by the multiple access networks when the multiple access networks report, as triggered by a preset event, the traffic information.

Optionally, the determining unit is configured to:

if it is determined, according to the traffic information and the network load information, that one first access network exists in the multiple access networks, determine the first access network as the target access network, where the first access networks are access networks with most remaining traffic and least access load; or if it is determined, according to the traffic information and the network load information, that at least two first access networks exist in the multiple access networks, determine one of the first access networks as the target access network according to a preset policy, where the first access networks are access networks with most remaining traffic and least access load; or if it is determined, according to the traffic information and the network load information, that at least two second access networks exist in the multiple access networks, determine a second access network with most remaining traffic as the target access network, where the second access networks are access networks with remaining traffic not less than a predetermined value and access load exceeding a preset value; or if it is determined, according to the traffic information and the network load information, that at least two third access networks exist in the multiple access networks, determine one of the third access networks as the target access network according to a preset policy, where the third access networks are access networks with remaining traffic less than a predetermined value and access load exceeding a preset value; or if it is determined, according to the traffic information and the network load information, that at least two third access networks exist in the multiple access networks, determine a third access network with a lowest tariff as the target access network, where the third access networks are access networks with remaining traffic less than a predetermined value and access load exceeding a preset value.

Figure 4:
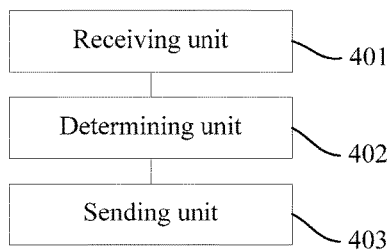
FIG. 4 is a schematic diagram of Embodiment 2 of a network access processing apparatus according to the present disclosure.

Referring to FIG. 4, FIG. 4 is a schematic diagram of Embodiment 2 of a network access processing apparatus, where the network access processing apparatus may include:

a receiving unit 401, configured to receive traffic information and network load information that are reported by multiple access networks;

a determining unit 402, configured to determine a target access network in the multiple access networks according to the traffic information and the network load information; and when a current access network of a user terminal is different from the target access network:

if the user terminal supports an ISMP, hand over the user terminal to the target access network; or if the user terminal supports an inter-system routing policy ISRP and it is determined that at least one application on the user terminal can be handed over to the target access network, hand over the at least one application to the target access network; and a sending unit 403, configured to: when an access network to which the user terminal is connected changes, send, to the user terminal, a message that includes traffic information and/or network load information.

Further, an embodiment of the present disclosure further provides hardware composition of a network access processing apparatus. The network access processing apparatus may include at least one processor (for example, CPU), at least one network interface or at least one other communications interface, a memory, and at least one communications bus, configured to implement communication connection between these components. The processor is configured to execute an executable module, such as a computer program, stored in the memory. The memory may include a high-speed random access memory (RAM), or may include a non-volatile memory (non-volatile memory), for example, at least one magnetic disk memory. Communication connection between the system gateway and at least one other network element is implemented by using the at least one network interface (which may be wired or wireless), and the Internet, a wide area network, a local network, a metropolitan area network, and the like may be used.

Figure 5:
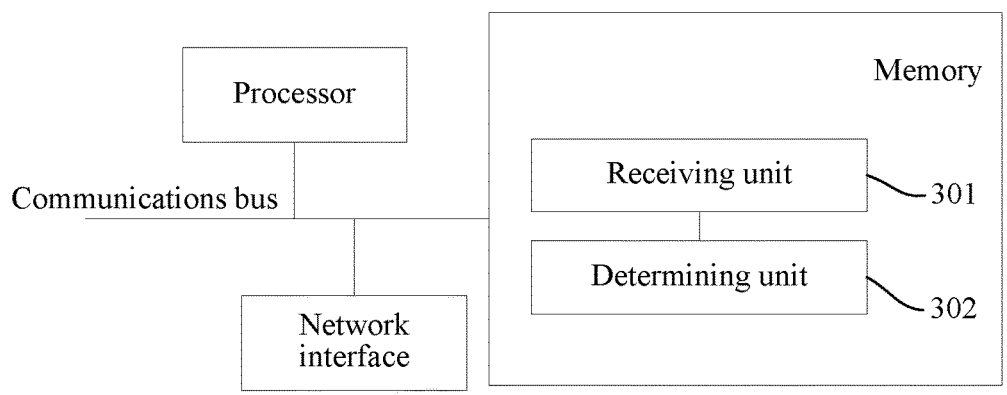
FIG. 5 is a schematic hardware composition diagram of Embodiment 1 of a network access processing apparatus according to the present disclosure.

Referring to FIG. 5, in some implementation manners, the memory stores a program instruction, and the program instruction may be executed by the processor, where the program instruction includes a receiving unit 301 and a determining unit 302, and for specific implementation of the units, reference may be made to corresponding units disclosed in FIG. 3.

Correspondingly, the processor may perform, according to an instruction and data that are stored in the memory, the following operations:

receiving traffic information and network load information that are reported by multiple access networks;

determining a target access network in the multiple access networks according to the traffic information and the network load information; and when a current access network of a user terminal is different from the target access network:

if the user terminal supports an ISMP, handing over the user terminal to the target access network; or if the user terminal supports an inter-system routing policy ISRP and it is determined that at least one application on the user terminal can be handed over to the target access network, handing over the at least one application to the target access network.

Figure 6:
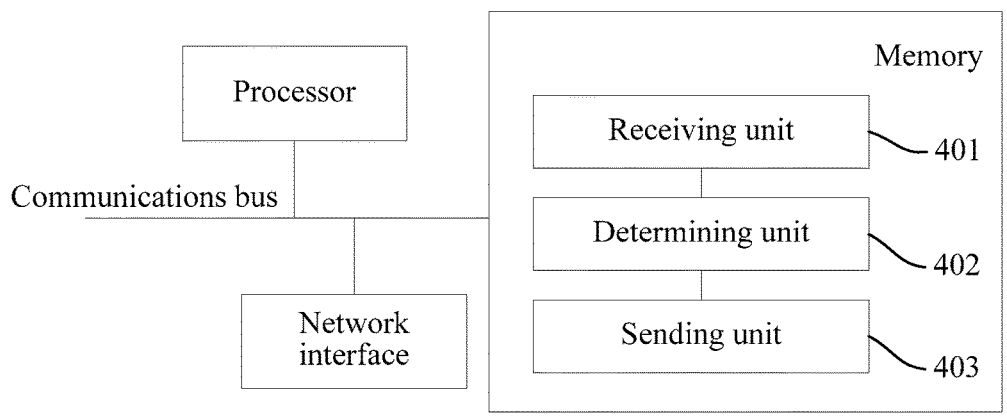
FIG. 6 is a schematic hardware composition diagram of Embodiment 2 of a network access processing apparatus according to the present disclosure.

Referring to FIG. 6, in some implementation manners, the memory stores a program instruction, and the program instruction may be executed by the processor, where the program instruction includes a receiving unit 401, a determining unit 402, and a sending unit 403, and for specific implementation of the units, reference may be made to corresponding units disclosed in FIG. 4.

Correspondingly, the processor may perform, according to an instruction and data that are stored in the memory, the following operations:

receiving traffic information and network load information that are reported by multiple access networks;

determining a target access network in the multiple access networks according to the traffic information and the network load information;

when a current access network of a user terminal is different from the target access network:

if the user terminal supports an ISMP, handing over the user terminal to the target access network; or if the user terminal supports an inter-system routing policy ISRP and it is determined that at least one application on the user terminal can be handed over to the target access network, handing over the at least one application to the target access network; and sending, to the user terminal, a message that includes traffic information and/or network load information It can be learned from the foregoing descriptions of the implementation manners, a person skilled in the art may clearly understand that some or all steps of the methods in the foregoing embodiments may be implemented by software in addition to a necessary universal hardware platform. Based on such an understanding, the technical solutions of the present disclosure essentially or the part contributing to the conventional art may be implemented in a form of a software product. The computer software product may be stored in a storage medium, such as a ROM/RAM, a magnetic disk, or an optical disc, and includes several instructions for instructing a computer device (which may be a personal computer, a server, or a network communication device such as a media gateway) to perform the methods described in the embodiments or some parts of the embodiments of the present disclosure.

It should be noted that the embodiments in this specification are all described in a progressive manner, for same or similar parts in the embodiments, reference may be made to these embodiments, and each embodiment focuses on a difference from other embodiments. Especially, device and system embodiments are basically similar to a method embodiment, and therefore are described briefly; for related parts, reference may be made to the part of the descriptions in the method embodiment. The described device and system embodiments are merely exemplary. The units described as separate parts may or may not be physically separate, and parts displayed as units may or may not be physical units, may be located in one position, or may be distributed on multiple network units. Some or all of the modules may be selected according to actual needs to achieve the objectives of the solutions of the embodiments. A person of ordinary skill in the art may understand and implement the embodiments of the present disclosure without creative efforts.

The foregoing descriptions are merely exemplary embodiments of the present disclosure, but are not intended to limit the protection scope of the present disclosure. Any modification, equivalent replacement, or improvement made without departing from the principle of the present disclosure shall fall within the protection scope of the present disclosure.

What is claimed is:

1. A network access processing method comprising:
receiving traffic information and network load information that are reported by multiple access networks;
determining a target access network in the multiple access networks according to the traffic information and the network load information, where determining the target access network includes one of the following:
   a) determining that one first access network exists in the multiple access networks, and selecting the first access network as the target access network, wherein first access networks are access networks with most remaining traffic and least access load;
   b) determining that at least two first access networks exist in the multiple access networks and selecting one of the first access networks as the target access network according to a preset policy;
   c) determining that at least two second access networks exist in the multiple access networks, and selecting a second access network with most remaining traffic as the target access network, wherein second access networks are access networks with remaining traffic greater than or equal to a predetermined value and access load exceeding a preset value;
   d) determining that at least two third access networks exist in the multiple access networks, and selecting one of the third access networks as the target access network according to a preset policy, wherein third access networks are access networks with remaining traffic less than a predetermined value and access load exceeding a preset value; and
   e) determining that at least two third access networks exist in the multiple access networks and selecting a third access network with a lowest tariff as the target access network; and
when a current access network of a user terminal is different from the target access network, performing one selected from the group consisting of:
   a) if the user terminal supports an inter-system mobility policy (ISMP), handing over the user terminal to the target access network; and
   b) if the user terminal supports an inter-system routing policy (ISRP) and it is determined that at least one application on the user terminal is capable of being handed over to the target access network, handing over the at least one application to the target access network.

2. The method according to claim 1, further comprising:
when the current access network of the user terminal is the same as the target access network, maintaining a connection of the user terminal to the current access network.

3. The method according to claim 1, wherein the receiving traffic information reported by multiple access networks comprises at least one selected from the group consisting of:
receiving the traffic information that is reported by the multiple access networks according to a preset period; and
receiving the traffic information that is reported, as triggered by a preset event, by the multiple access networks.

4. The method according to claim 3, wherein the preset event comprises one or more selected from the group consisting of:
remaining user traffic is not greater than a preset value, a level of remaining user traffic changes, used traffic is greater than a threshold, a level of used traffic changes, and the user terminal enables a preset service type.

5. The method according to claim 1, wherein the receiving network load information reported by multiple access networks comprises at least one selected from the group consisting of:
receiving the network load information that is reported by the multiple access networks according to a preset period;
receiving the network load information that is reported, as triggered by a preset event, by the multiple access networks; and
receiving the network load information that is reported by the multiple access networks when the multiple access networks report, as triggered by a preset event, the traffic information.

6. The method according to claim 5, wherein the preset event comprises at least one selected from the group consisting of:
remaining user traffic is not greater than a preset value, a level of remaining user traffic changes, used traffic is greater than a threshold, a level of used traffic changes, and the user terminal enables a preset service type.

7. The method according to claim 1, further comprising:
when an access network to which the user terminal is connected changes, sending, to the user terminal, a message that comprises traffic information and/or network load information.

8. A network access processing apparatus comprising a processor and a non-transitory computer readable medium containing program instructions for causing the processor to:
receive traffic information and network load information that are reported by multiple access networks;
determine a target access network in the multiple access networks according to the traffic information and the network load information by one of the following determinations:
   a) determine that one first access network exists in the multiple access networks, and select the first access network as the target access network, wherein first access networks are access networks with most remaining traffic and least access load;
   b) determine that at least two first access networks exist in the multiple access networks and select one of the first access networks as the target access network according to a preset policy;
   c) determine that at least two second access networks exist in the multiple access networks, and select a second access network with most remaining traffic as the target access network, wherein second access networks are access networks with remaining traffic greater than or equal to a predetermined value and access load exceeding a preset value;
   d) determine that at least two third access networks exist in the multiple access networks, and select one of the third access networks as the target access network according to a preset policy, wherein the third access networks are access networks with remaining traffic less than a predetermined value and access load exceeding a preset value; and e) determine that at least two third access networks exist in the multiple access networks, and select a third access network with a lowest tariff as the target access network; and when a current access network of a user terminal is different from the target access network, performing one selected from the group consisting of:

a) if the user terminal supports an ISMP, hand over the user terminal to the target access network; and b) if the user terminal supports an ISRP and it is determined that at least one application on the user terminal is capable of being handed over to the target access network, hand over the at least one application to the target access network.

9. The apparatus according to claim 8, wherein the processor is further caused to:

when the current access network of the user terminal is the same as the target access network, maintain a connection of the user terminal to the current access network.

10. The apparatus according to claim 8, wherein the processor is further caused to:

receive the traffic information that is reported by the multiple access networks according to a preset period; or receive the traffic information that is reported, as triggered by a preset event, by the multiple access networks.

11. The apparatus according to claim 8, wherein the processor is further caused to perform at least one selected from the group consisting of:

receive the network load information that is reported by the multiple access networks according to a preset period;

receive the network load information that is reported, as triggered by a preset event, by the multiple access networks; and receive the network load information that is reported by the multiple access networks when the multiple access networks report, as triggered by a preset event, the traffic information.

12. The apparatus according to claim 8, wherein the processor is further caused to:

when an access network to which the user terminal is connected changes, send, to the user terminal, a message that comprises traffic information and/or network load information.

\* \* \* \* \*